United States Patent [19]

Kagami et al.

[11] Patent Number: 5,450,314
[45] Date of Patent: Sep. 12, 1995

[54] DATA PROCESSING METHODS AND APPARATUS FOR SUPPORTING ANALYSIS/JUDGEMENT

[75] Inventors: Akira Kagami; Michitaka Kosaka, both of Sagamihara; Hiroaki Oyama, Yokohama, all of Japan

[73] Assignee: Hitachi, Ltd., Tokyo, Japan

[21] Appl. No.: 853,515

[22] Filed: Mar. 18, 1992

[30] Foreign Application Priority Data

Mar. 20, 1991 [JP] Japan .................................. 3-080359

[51] Int. Cl.6 .............................................. G06F 19/00
[52] U.S. Cl. ......................................... 364/148; 395/20
[58] Field of Search ..................... 395/135, 20, 50, 53; 364/516, 148-150, 578, 151

[56] References Cited

U.S. PATENT DOCUMENTS

| | | | |
|---|---|---|---|
| 4,731,743 | 3/1988 | Blancato | 395/135 |
| 4,910,660 | 3/1990 | Li | 364/148 |
| 5,016,204 | 5/1991 | Simoudis et al. | 364/578 |
| 5,060,171 | 10/1991 | Steir et al. | 395/135 |

OTHER PUBLICATIONS

"Kansei Engineering", M. Nagamachi, Kaibundo 1989, pp. 43-84 (Translation).
Nagamachi, Mitsuo. "Kansei Engineering and a Product Development," The Journal of the Business Engineering of Japan, vol. 41, No. 4B, pp. 66-71. (Japanese), 1990, (no month).

*Primary Examiner*—Emanuel T. Voeltz
*Assistant Examiner*—Edward Pipala
*Attorney, Agent, or Firm*—Fay, Sharpe, Beall, Fagan, Minnich & McKee

[57] ABSTRACT

Data processing methods and apparatus, wherein an object to be appraised is inputted; the inputted object to be appraised is divided into at least one structural elements which are stored in storage unit; information is inputted which indicates an appraisal for the inputted object to be appraised; a combination of elements constituting the object to be appraised is corresponded to the inputted appraisal, and the correspondence is classified into at least one criterions which are stored in the storage means; an arbitrary criterion is selected from among stored criterions; a combination of structural elements is obtained on the basis of the selected criterion; appraisal information is inputted for the obtained combination of structural elements; the correspondence of the obtained combination of structural elements to the appraisal is compared with the selected criterion to identify a criterion; a combination of elements constituting the object to be appraised is created on the basis of the identified criterion; information is inputted for designating elements to be changed and elements not to be changed in the created combination; and a new combination is created on the basis of the designation information.

58 Claims, 13 Drawing Sheets

F I G. 5
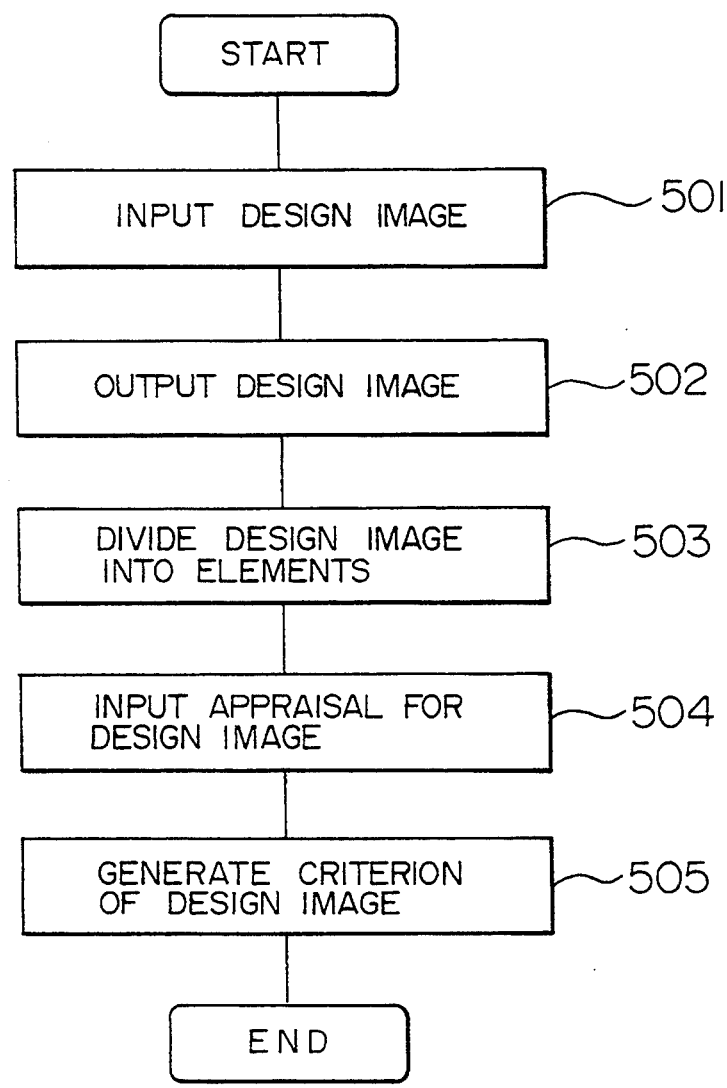

FIG. 10

<PRETTY — NOT PRETTY>

| No. | SCORE | SHAPE OF NECK | | | | COLOR | |
| --- | --- | --- | --- | --- | --- | --- | --- |
| | | U | V | ○ | WITH | RED | OR-ANGE |
| 1 | 0.63 | ○ | × | × | × | ○ | × |
| 2 | 0.79 | × | × | × | ○ | × | ○ |
| . | . | . | . | . | . | . | . |

FIG. 12

PRETTY — NOT PRETTY : KEY ITEM = BLOUSE
(WITH NECK, WHITE, ···)

| No. | SCORE | FORM OF SKIRT | | | COLOR OF SKIRT | | |
| --- | --- | --- | --- | --- | --- | --- | --- |
| | | TIGHT | FLARE | GATHER | BLACK | RED | BROWN |
| 1 | 0.89 | × | ○ | × | ○ | × | × |
| 2 | 0.73 | ○ | × | × | × | ○ | × |
| . | . | . | . | . | . | . | . |

1201

| COMMON KANSEI | No. | PAIRED ADJECTIVES | SCORE |
|---|---|---|---|
| I | 1 | INTELLECTUAL<br>— NOT INTELLECTUAL | 0.73 |
| | 2 | ELEGANT<br>— NOT ELEGANT | 0.82 |
| | 3 | | |

DATA PROCESSING METHODS AND APPARATUS FOR SUPPORTING ANALYSIS/JUDGEMENT

BACKGROUND OF THE INVENTION

The present invention relates to data processing for supporting analysis/judgement based on human sensitivity called "kansei" such as fashion sense and preference which is a human's ambiguous reactive characteristic for a sense, and more particularly to data processing methods and apparatus suitable for supporting analysis/judgement which requires high level and various kansei.

A kansei data processing system refers to a system for processing data relative to the human's kansei. This kind of conventional system is described, for example, in Mitsuo Nagamachi, "Kansei Engineering", pp 43–84, (Kaibundo, 1989).

According to this article, when a plurality of adjective groups are inputted from a user, a conventional system (kansei engineering expert system) extracts a main image represented by the adjective groups, narrows down only such adjectives that match the image well, independently selects design elements represented by the narrowed down adjectives, and synthesizes and outputs these elements. If the user is not satisfied with the output result, the elements constituting the synthesized design are independently changed to other elements. Incidentally, the relationship between the design element and the adjective is obtained as an appraised value or score by processing survey results using Semantic Differential (SD) for the whole design including respective design elements with the evaluation theory class I.

SUMMARY OF THE INVENTION

As described above, the utilization of the conventional system begins with inputting user's favorite adjectives. However, the use of adjectives (an image conceived by the user) differs a lot among individuals. Particularly, it can be said that taste in fashion which is complicated, subtle and widely changeable cannot be exactly expressed only by adjectives. The conventional system, thus employing, as unique inputs, adjectives which are different in use among individuals, so that the user's kansei cannot be correctly analyzed or utilized.

Also, generally in the appraisal based on human's kansei, the addition nature does not dominate a combination of design elements. That is, a combination of design elements may result in increasing or decreasing its appraisal. More specifically, even if design elements are individually optimized, a resultant combination thereof is not always the best one. From this point of view, the conventional system individually collects appraisals for each the of design elements, constitutes a combination of a plurality of individual design elements by a simple addition of the individual design elements, and synthesizes them independently of each other, which presents difficulties in manipulations.

It is therefore an object of the present invention to provide improved data processing method and apparatus for supporting analysis/judgement which can eliminate the above-mentioned problems inherent to the prior art techniques.

It is another object of the present invention to provide data processing method and apparatus which can uniformly and stably accomplish analysis/judgement requiring high-level and various kansei such as recommendation of coordinates for fashion goods instead of a human in a sufficiently satisfactory accuracy level.

According to one aspect of the present invention, a data processing method for supporting analysis/judgement includes the steps of inputting an object to be appraised; dividing the inputted object to be appraised into structural elements and storing the elements in storage unit; inputting information indicative of an appraisal for the inputted object to be appraised; and identifying relationships between the structural elements of the object to be appraised and the inputted appraisal, and classifying the relationships and storing the relationships in the storage unit.

According to another aspect of the present invention, a data processing method for supporting analysis/judgement includes the steps of selecting an arbitrary criterion among at least one criterion; obtaining a combination of structural elements on the basis of the selected criterion; inputting an appraisal information for the obtained combination of structural elements; comparing of the obtained combination of structural elements and the appraisal with the selected criterion to identify a criterion; creating a combination of elements constituting an object to be appraised on the basis of the identified criterion; inputting information for designating elements to be changed and elements not to be changed in the created combination; and creating a new combination on the basis of the designation information.

According to still another aspect of the present invention, a data processing method for supporting analysis/judgement includes the steps of inputting an object to be appraised; dividing the inputted object to be appraised into at least one structural elements and storing the elements in storage unit; inputting information indicative of an appraisal for the inputted object to be appraised; identifying relationships between the structural elements constituting the object to be appraised and the inputted appraisal, and classifying the relationsihps and storing the same in the storage means; selecting a criterion from among stored criterions; obtaining a combination of structural elements on the basis of the selected criterion; inputting appraisal information for the obtained combination of structural elements; comparing the obtained combination of structural elements and the appraisal with the selected criterion to identify and the criterion; creating a combination of elements constituting the object to be appraised on the basis of the identified criterion; inputting information for designating elements to be changed and elements not to be changed in the created combination; and creating a new combination on the basis of the designation information.

The data processing method and apparatus according to the present invention are generally composed of a system to accumulate kansei information and/or a system to use kansei information. In the system to accumulate kansei information, appraisal information on users' objects to be appraised is collected and classified to create criterions.

In the system to use kansei information, objects to be appraised are synthesized on the basis of an arbitrary criterion thus created, and the criterion for a particular user is identified on the basis of appraisal information on objects to be appraised of the particular user. Preferably, the object to be appraised is synthesized on the basis of the identified criterion, and the particular user can modify structural elements of the criterion.

In the data processing method and apparatus according to the present invention, the appraisal information directly inputted from an input unit by a user is such information as "Do you like it or not?", "Which do you like better?", "Are you satisfied with it?", and "How about this one?", by way of example. These questions are kansei with respect to a direct determination made to objects to be appraised (such as design). Therefore, this appraisal information, different from an intermediate expression of kansei such as the adjective which may differ in its usage remarkably among individuals, allows a more precise analysis of kansei.

Also, since the storage accumulates appraisals for combinations of structural elements of objects to be appraised, if a user is not satisfied with a current combination proposal, it can be entirely replaced with a different desirable combination. Further, the unit for indicating a particular element in a current combination can propose a different combination in which satisfied elements are left and other undesirable elements are replaced. These units allow the user to fast and precisely obtain desired objects to be appraised.

BRIEF DESCRIPTION OF THE DRAWINGS

FIG. 5 is a flow chart illustrating an example of the kansei data collection processing when the data processing apparatus of FIG. 1 is applied to a system for recommendation coordinates for women's fashion;

FIG. 7 is a diagram illustrating an image for method;

FIG. 10 is a table indicating the results of an appraisal for a design image processed by the evaluation theory class I;

FIG. 11 diagram illustrating an example of the configuration of a multi-layer neural network for learning kansei;

FIG. 12 is a table showing an example of a file layout of a kansei database;

DESCRIPTION OF THE PREFERRED EMBODIMENTS

One embodiment of the present invention will hereinbelow be described in detail with reference to the accompanying drawings.

Figure 1:
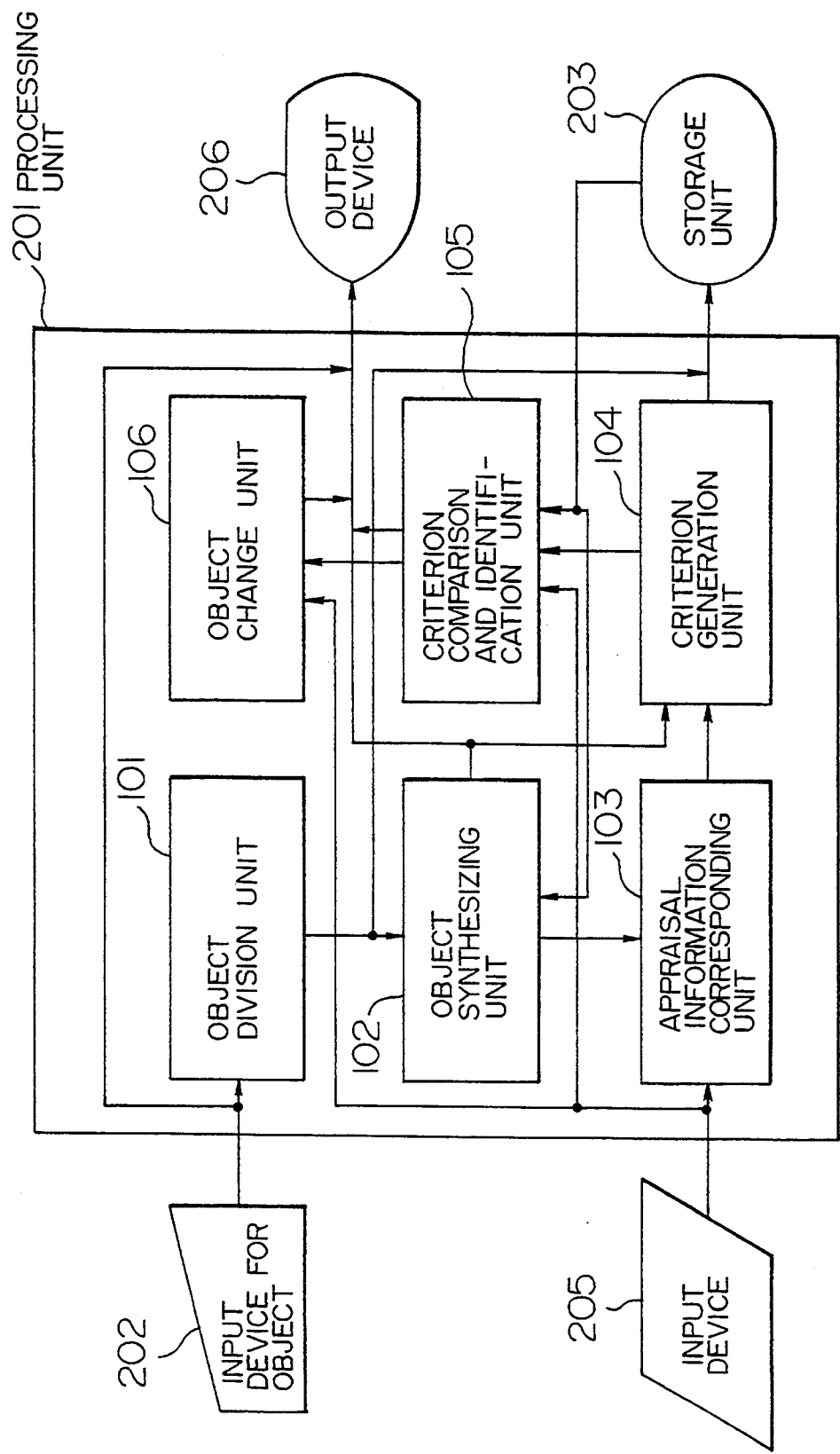
FIG. 1 is a block diagram illustrating the configuration of a data processing apparatus for supporting analysis/judgement according to one embodiment of the present invention.

FIG. 1 is a block diagram illustrating the basic configuration of a data processing apparatus for supporting analysis/judgement according to the present invention. Suppose herein that kansei is referred to as criterion and an object to be appraised by kansei (for example, a design) as an object to be appraised.

In FIG. 1, a processing unit 201 of the data processing apparatus comprises input device 202 for inputting an object to be appraised in a form detectable by human's feeling; a storage unit 203 for storing a variety of information; a division unit 101 for dividing the inputted object to be appraised into at least one structural elements and storing the same in a first storage area of the storage unit 203; synthesizing unit 102 for combining at least one the divided structural elements to synthesize an object to be appraised; an output device 206 for outputting the synthesized object to be appraised in a form detectable by human's feeling; an input device 205 for a user to input his or her will in the form of electric signal; an appraisal information corresponding unit 103 for corresponding the object to be appraised outputted to the output device to appraisal information and inputting such correspondence from the input device 205; a criterion generation unit 104 for classifying the inputted correspondence of a combination of structural elements of the object to be appraised to the appraisal information into at least one criterions and storing the same in a second storage area of the storage unit 203; a criterion comparison and identification unit 105 for comparing an arbitrary criterion stored in the storage unit 203 with the correspondence of a combination of structural elements based on the arbitrary criterion to newly inputted appraisal information for the combination and identifying the criterion; a unit 106 for inputting from the input device 205 information for designating elements to be changed and elements to be maintained, in a combination of elements constituting the object to be appraised on the basis of the identified criterion, and changing the object to be appraised.

The units 101-104 constitute a system to accumulate kansei information for generating at least one criterion on the basis of kansei data from many users, while the units 102, 105, 106 constitute a system to use kansei information for creating an object to be appraised for a particular user on the basis of the thus generated criterion.

Figure 2:
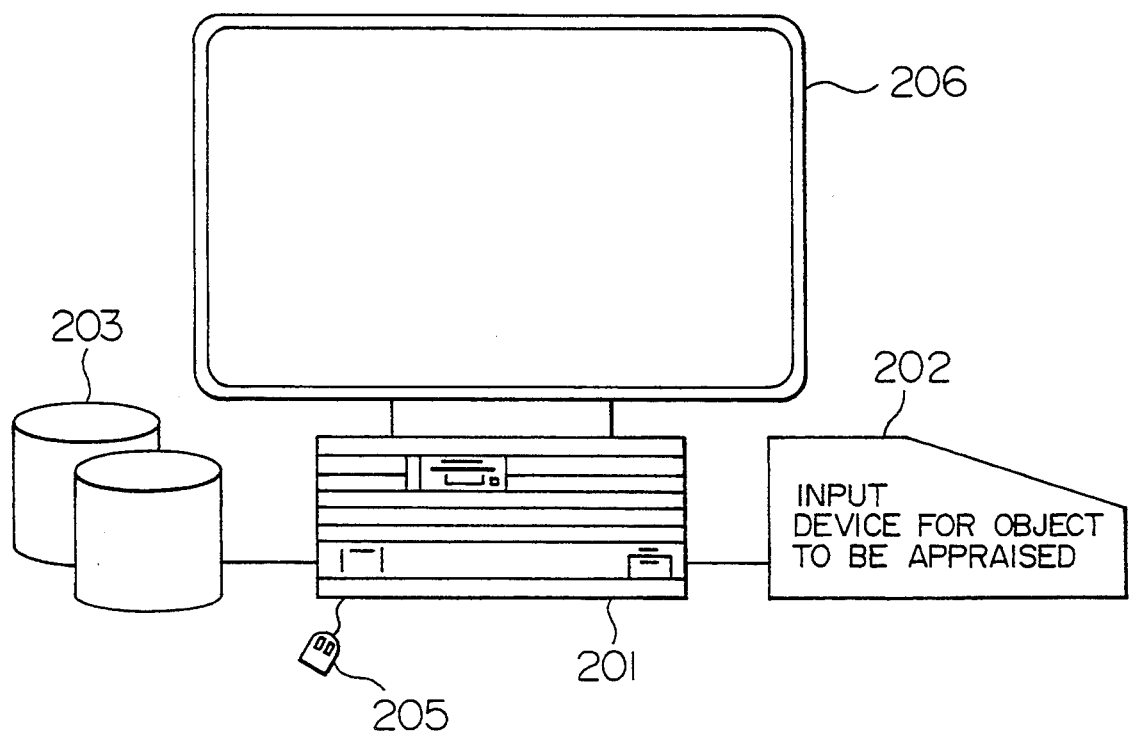
FIG. 2 is a diagram illustrating an example of a combination of ordinary devices embodying the data processing apparatus of FIG. 1.

An example of the configuration of devices for realizing this apparatus includes, as shown in FIG. 2, the processing unit, e.g. computer 201 with the input device 202 for inputting an object to be appraised, the output device 206, the storage unit 203 and the input device 205, all being connected to the processing unit 201.

Since a human obtains information from the sense of sight than information from other sense organs, it is desirable to treat an object to be appraised as visual informations. However, other sensory information such as speech or acoustic information may of course be used.

The input device 202 for inputting an object to be appraised may be an image input unit such as a so-called image scanner or image reader. These image input units may be one for reading a black and white (binary) image or a half-tone image, however, a so-called full-color or natural color input unit is desirable which can treat abundant colors. If this requirement is satisfied, the input device may be a television camera. On the other hand, if speech is used as an object to be appraised, a speech input device such as a microphone is used as the input device. In the preferred embodiment, the output device 206 is desirably a color display, particularly a high resolution color graphic display, Alternatively, it may be a color printer. The storage unit 203 is not limited to a magnetic storage unit but may be an optical disk drive or a semiconductor memory. Any storage unit may be used as long as it has a sufficient capacity for executing programs and storing image files. The input device 205 is shown as a pointing device (mouse) in FIG. 2, however, it may be another input device such as a keyboard or a combination of such devices, Incidentally, if an object to be appraised is drawn on paper and inputted by reading it by an input device, the operator may operate the units 101–104 seeing the object to be appraised on the paper without outputting the inputted object to be appraised to the output device.

As will be immediately understood from the foregoing explanation by those skilled in the art, the configuration of devices for implementing the present invention may be a generally called computer or computer system. More specifically, it may be a large-size computer, a work station or a personal computer. Alternately, an exclusive apparatus may be manufactured for implementing the present invention if it provides the above-mentioned functions of the peripheral devices.

Figure 3:
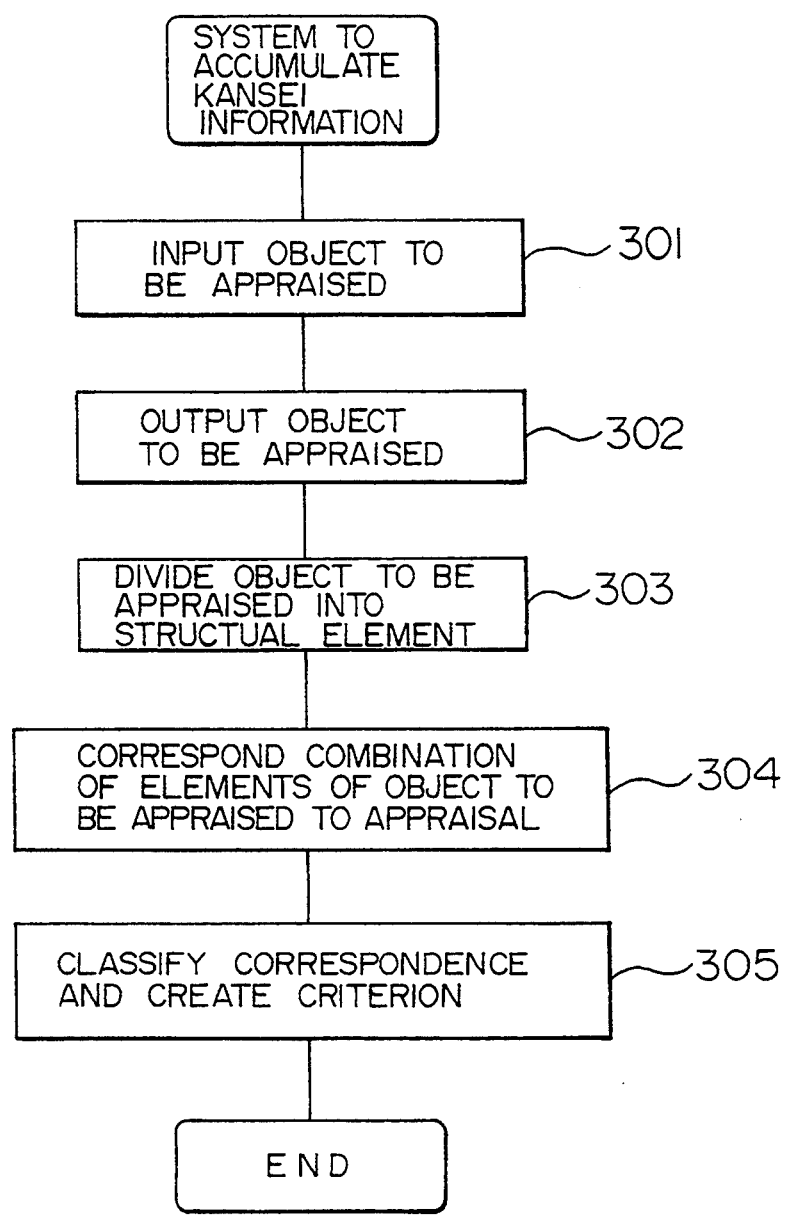
FIG. 3 is a flow chart illustrating an example of a kansei data collection processing in the data processing apparatus of FIG. 1.

The processing within the processing unit 201 of the data processing apparatus may be divided into accumulation of kansei information and use of the same, as described above. A processing flow of the accumulation system will first be described with reference to FIG. 3. In the accumulation system of kansei data, a wide variety of kansei data is accumulated from as many users as possible and classified.

An object to be appraised is inputted from the input device 202 (step 301), and outputted to the output device 206 (step 302). When instruction information is inputted from the input device for instructing a division of the inputted object to be appraised, the unit 101 divides the inputted object to be appraised into at least one structural element and stores the same in the first storage area of the storage unit 203 (step 303).

The unit 102 combines the divided structural elements to synthesize the object to be appraised, and then the user is instructed to input appraisal information on the object to be appraised from the input device 205. The unit 103 corresponds the combination of the structural elements to the appraisal information (step 304). Based on the correspondence from the user, the unit 104 classifies the correspondence of the combination of the structural elements to the appraisal information and stores as at least one criterions in the second storage area of the storage unit 203 (step 305).

Figure 4:
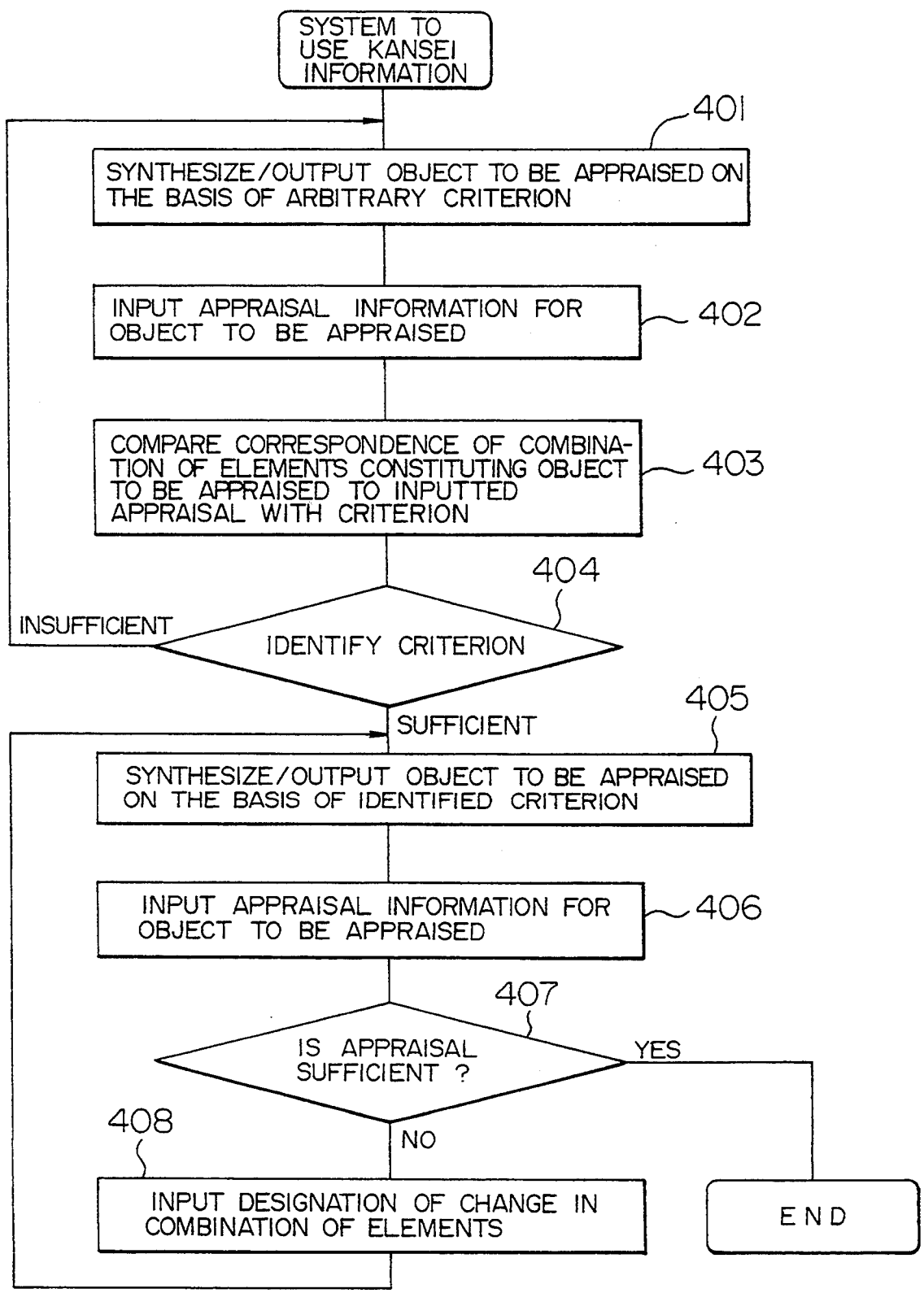
FIG. 4 is a flow chart illustrating an example of a kansei data use processing in the data processing apparatus of FIG. 1.

Next, a processing flow of the use system will be explained with reference to FIG. 4. Main functions of the use system include analyzing a criterion of a particular user on the basis of accumulated criterions and creating an object to be appraised by the use of the analysis results such that the particular user will highly appreciate the created object to be appraised.

First, an arbitrary criterion is selected by the unit 105 from criterions stored in the storage unit 203, and a combination of typical structural elements which is highly appraised by the selected criterion is extracted from the storage unit 203. The unit 102 then combines the structural elements to synthesize an object to be appraised and outputs it to the output device 206 (step 401). Next, the unit 105 prompts the particular user to input appraisal information on the outputted object to be appraised from the input device 205, and corresponds the combination of the structural elements to the inputted appraisal information (step 402). The unit 105 further compares this correspondence with the criterions stored in the storage unit 203 to identify a criterion of the particular user (step 403). The above steps 401–404 are repeated until the accuracy of the identification is determined to be sufficient (step 404). The unit 105 creates a combination of structural elements which is highly appraised on the basis of the criterion of the particular user, the identification of which has been determined to be sufficient, combines the structural elements to synthesize an object to be appraised, and outputs the same to the output device 206 (step 405). The unit 106 prompts the particular user to input appraisal information on the outputted object to be appraised from the input device 205 (step 406). When the appraisal is low or insufficient (step 407), the particular user is instructed to input information for designating elements in the combination to be changed or not to be changed from the input device 205 (step 408). The unit 106 changes elements in the combination on the basis of the user's designation, followed by the processing flow returning to step 405 to newly synthesize an object to be appraised and output the same to the output device 206. The above steps 405–408 are repeated until the user is finally satisfied with a created object to be appraised (step 407). Thus, an object to be appraised for a particular user can be created on the basis of criterions made based on kansei data of ordinary users.

Incidentally, if the user is not yet satisfied after the steps 405–408 are repeated several times, the identification of kansei criterion should be made again or the processing flow should be returned to the accumulation system to build again a kansei database.

Next, description will be made as to a case where the data processing apparatus of the present invention is applied to a system for recommendation of coordinates for woman's fashion. Specifically, detailed explanation will be given of a case where a design image for coordinating women's clothes is set as an object to be appraised, utilizing kansei to determine "like dislike" of a design image as a criterion.

This system can be utilized in department stores or clothing item retail stores such as fashion boutiques as a sales promotion tool for face-to-face sales.

The configuration of this system is the same as that shown in FIG. 1, wherein a work station is employed as the computer 201, a color image scanner as the input device 202 for inputting an object to be appraised, a mouse as the input device 205, a magnetic disk drive as the storage unit 203, and a graphic display as the output device 206, respectively, by way of example.

Figure 6:
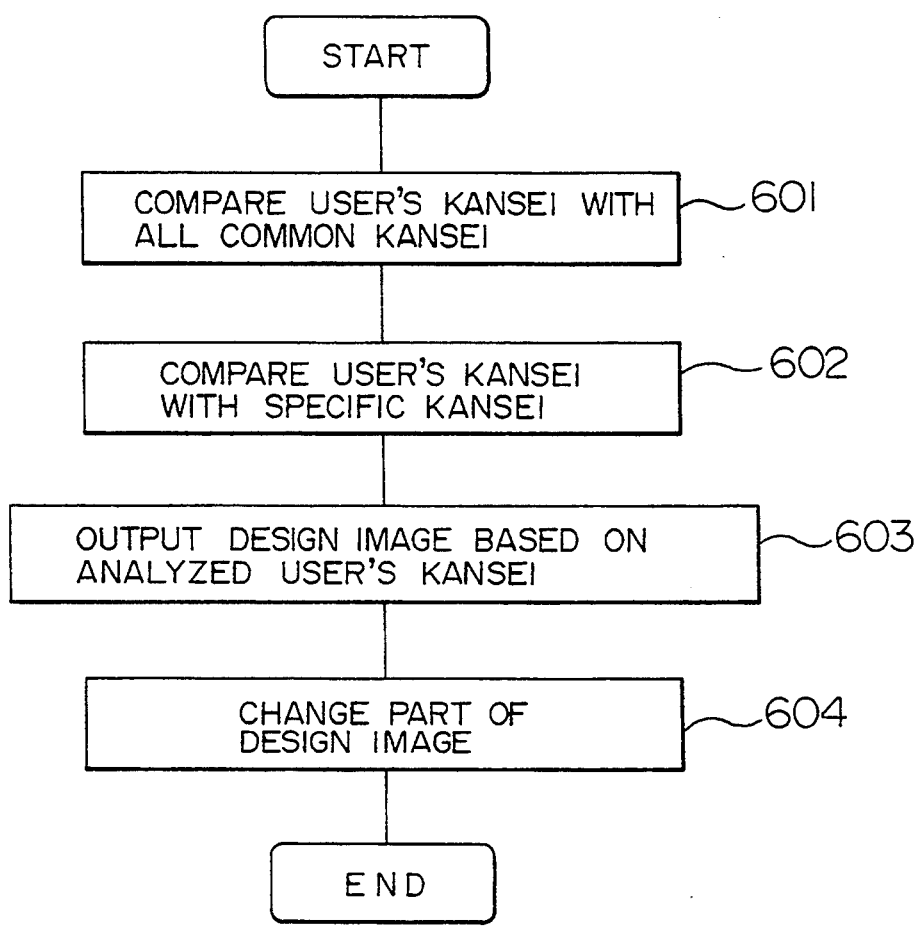
FIG. 6 is a flow chart illustrating an example of the kansei data use processing when the data processing apparatus of FIG. 1 is applied to a system for recommendation of coordinates for women's fashion.

FIG. 5 is a detailed flow chart illustrating an example of a processing of a data accumulation sub-system in the present system, and FIG. 6 is a detailed flow chart illustrating an example of a processing of a data use sub-system in the same system.

First, the processing shown in FIG. 5 will be explained in sequence.

<Step 501> Input of design image as object to be appraised

Figure 7A:
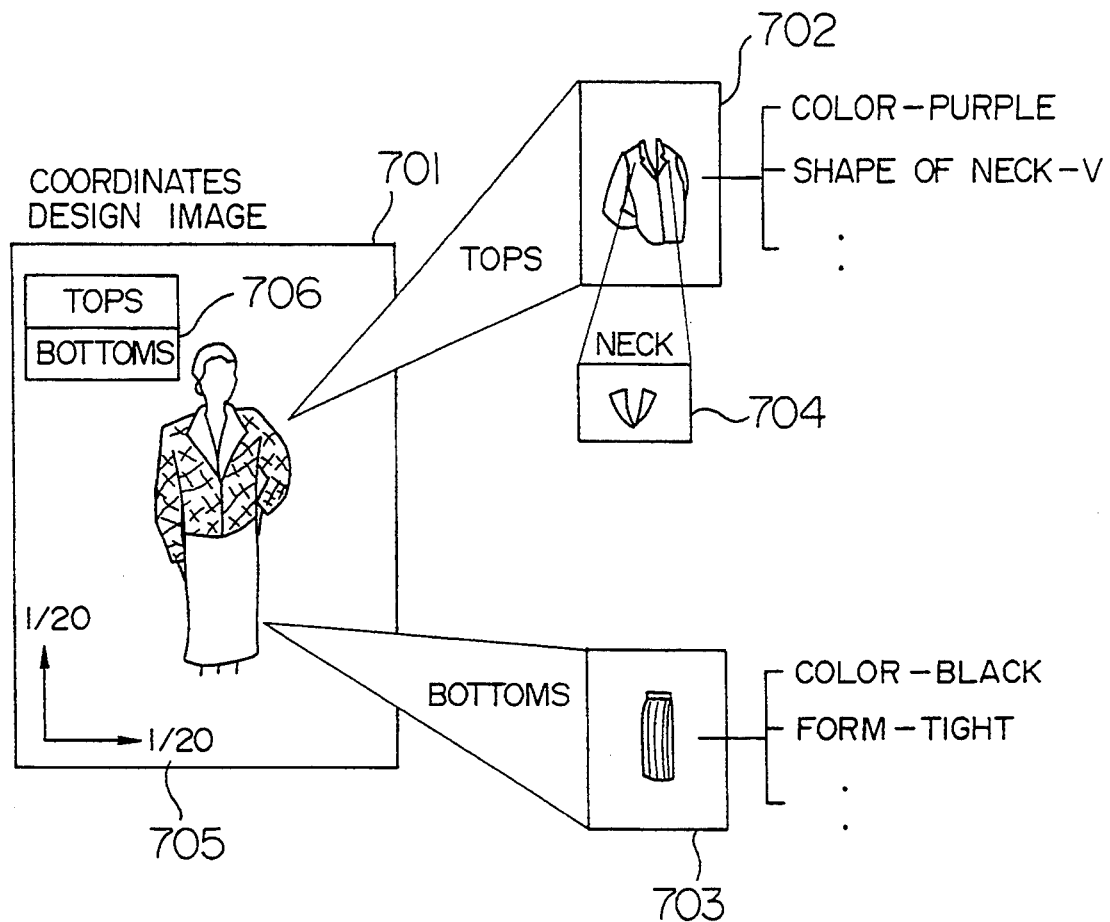
FIG. 7A is a diagram illustrating an image for designing coordinates and an example of its division method.

First, a design image 701 for coordinates to either one or both of tops 702 (for example, blouse), and bottoms 703 (for example, a skirt), as shown in FIG. 7A, is inputted using the color image scanner 202. In this event, a reduced scale of the coordinate image 701, for example, a ratio of the image size to the actual size (for example, 1/20) is also inputted together with the coordinate image 701.

<step 502> Output of design image

The inputted design image 701 for coordinates is outputted to the graphic display 206.

<step 503> Division of structural elements of design image

The inputted design image 701 for coordinates is first divided into the tops 702 and the bottoms 703 by the unit 101. Note, however, that if either one of the tops 702 and the bottoms 703 only has been inputted, the following division processing is of course not necessary.

First, examination is made as to whether or not the inputted design image includes image elements stored in the magnetic storage unit 203. This processing employs a pattern matching processing of particular images which is well known by those skilled in the art. In this event, if the mouse 205 is used to indicate a kind of element 706 (e.g., tops or bottoms), where on the image each element exists, and so on, the accuracy and speed of the pattern matching can be remarkably improved.

When an image element has already been stored as one of structural models, such image element may be cut out and displayed in a manner different from other regions, for example, in a blink mode, for easy distinction. Other image elements which have not been stored may be cut out by tracing the boundaries thereof by the user with the mouse 205 or by inputting several reference points to allow the system to interpolate these points with a smooth straight line or curve.

Figure 7B:
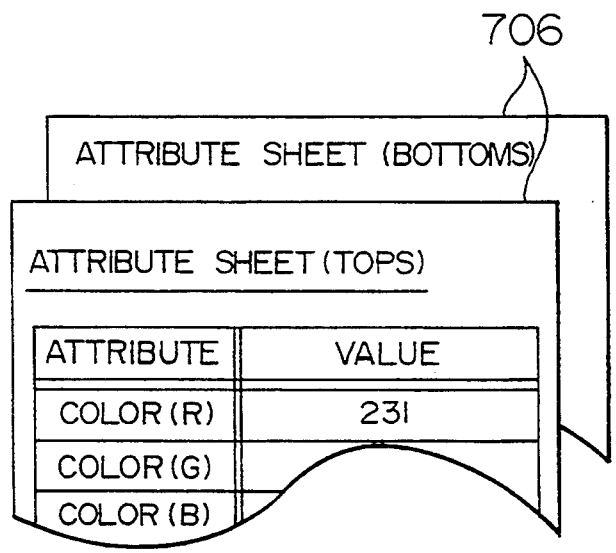
FIG. 7B is a diagram illustrating an example of an attribute sheet for indicating characteristic data of each divided image element.

In this embodiment, the image elements of the tops 702 and the bottoms 703 are cut out and stored in the magnetic disk unit 203 after the sizes thereof are adjusted to comply with a standard scale by using the reduced scale 705. The image elements 702 and 703 have their characteristic data resolved by an image processing to be expressed by numerical values. Specifically, the characteristic data of the tops is resolved on an attribute sheet 706, for example, into the color of the tops, the shape of neck which is a partial element of the tops (e.g., V-shape, ...). The characteristic data of the bottoms is also resolved in detail into elements such as the form (tight, ...), and such elements are expressed by numerical values and indicated on the attribute sheet 706, as shown in FIG. 7B. As to color, intensities of light of the three primary colors or red, green and blue are-extracted and utilized as characteristic data. The neck in turn is extracted by a matching processing using basic forms 704 of necks previously registered in the magnetic disk unit 203 as particular patterns, and if the cut out neck on the image matches one of the basic forms 704, it is given the symbol of the basic form.

Figure 8:
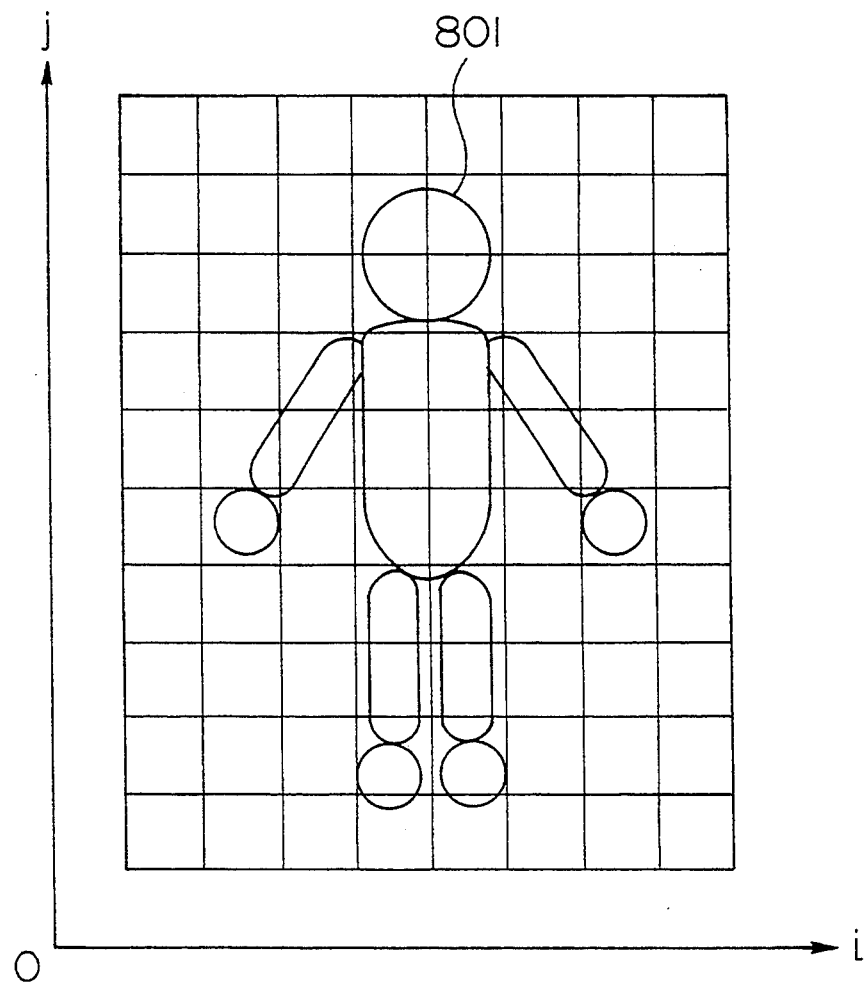
FIG. 8 is a diagram illustrating a model image of a standard woman's figure for synthesizing image element images.

Incidentally, as shown in FIG. 8, four sizes of model images 801 for women's figure, e.g., S, M, L and LL have been previously prepared in a standard scale and stored in the magnetic disk unit 203. The synthesis of image elements are realized by cutting and pasting image elements on the model image 801. A reference position for cutting and pasting image elements is expressed by a meshed two dimensional coordinate system having i-j axes which is superimposed on the model image 801.

<step 504> Input of appraisal for a design image

Figure 9A:
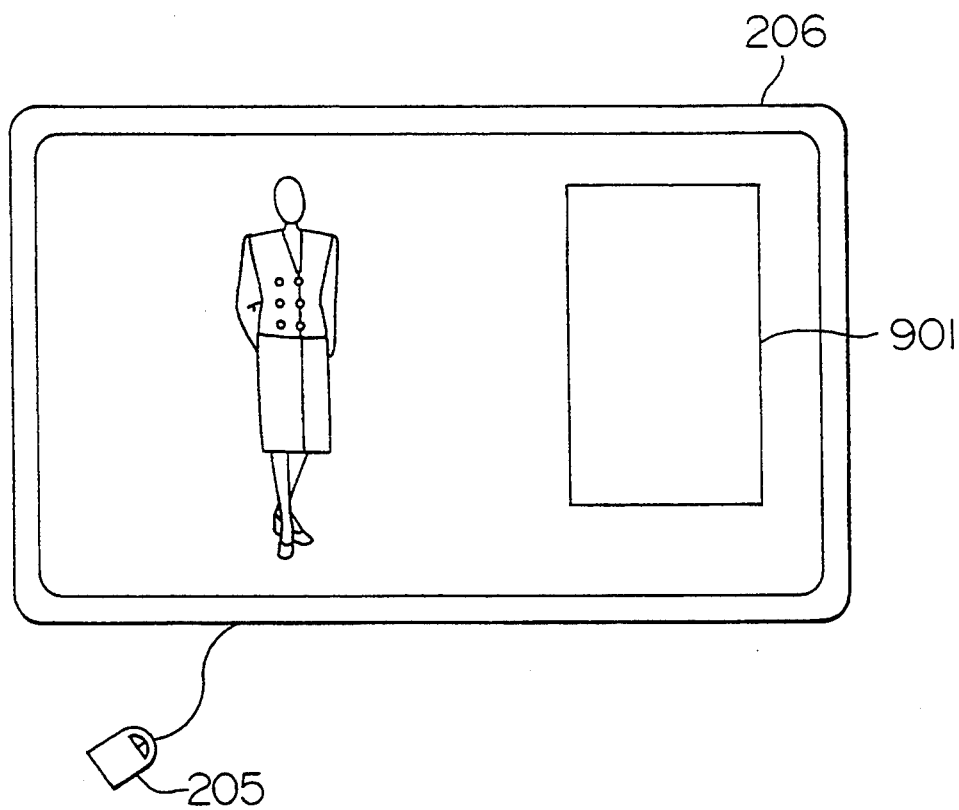
FIGS. 9A and 9B are diagrams used for explaining a method of appraising a design image using the Semantic Differential of paired adjectives.
Figure 9B:
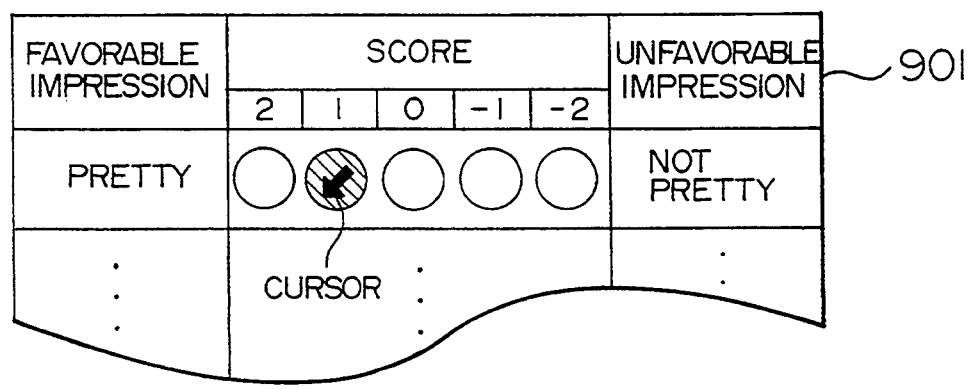

The outputted design image 701 is appraised by using the Semantic Differential of a plurality of paired adjectives for expressing women's clothes coordinates. Specifically, the unit 103 classifies favorable impressions and unfavorable impressions of paired adjectives such as "pretty—not pretty" into, e.g., five levels, and a table 901 indicating scores in these five levels are outputted simultaneously with the design image, as shown in FIG. 9A, to allow the user to select and input the score in one of the five levels by the mouse 205.

Incidentally, adjectives have been previously classified into common factors by a factor analysis and correlation values among adjectives in each classification have been calculated. It is supposed hereinbelow that kansei expressed by a common factor is called a common kansei and kansei expressed by sets of paired adjectives is called a specific kansei for convenience.

<step 505> Generation of criterion for design image

The unit 104 statistically processes the appraised results of sets of paired adjectives for a design image by the Semantic Differential by the evaluation theory class I to obtain combinations of elements constituting the design image and scores therefor with respect to respective sets of paired adjectives. FIG. 10 shows scores for combinations of structural elements of a design image (e.g., the shape and color of neck and, and so on) with respect to a set of paired adjectives, for example, "pretty—not pretty".

Incidentally, as described above, conventional system techniques may be used as they are for executing the processings at steps 504 and 505.

Figures 11A, 11B:
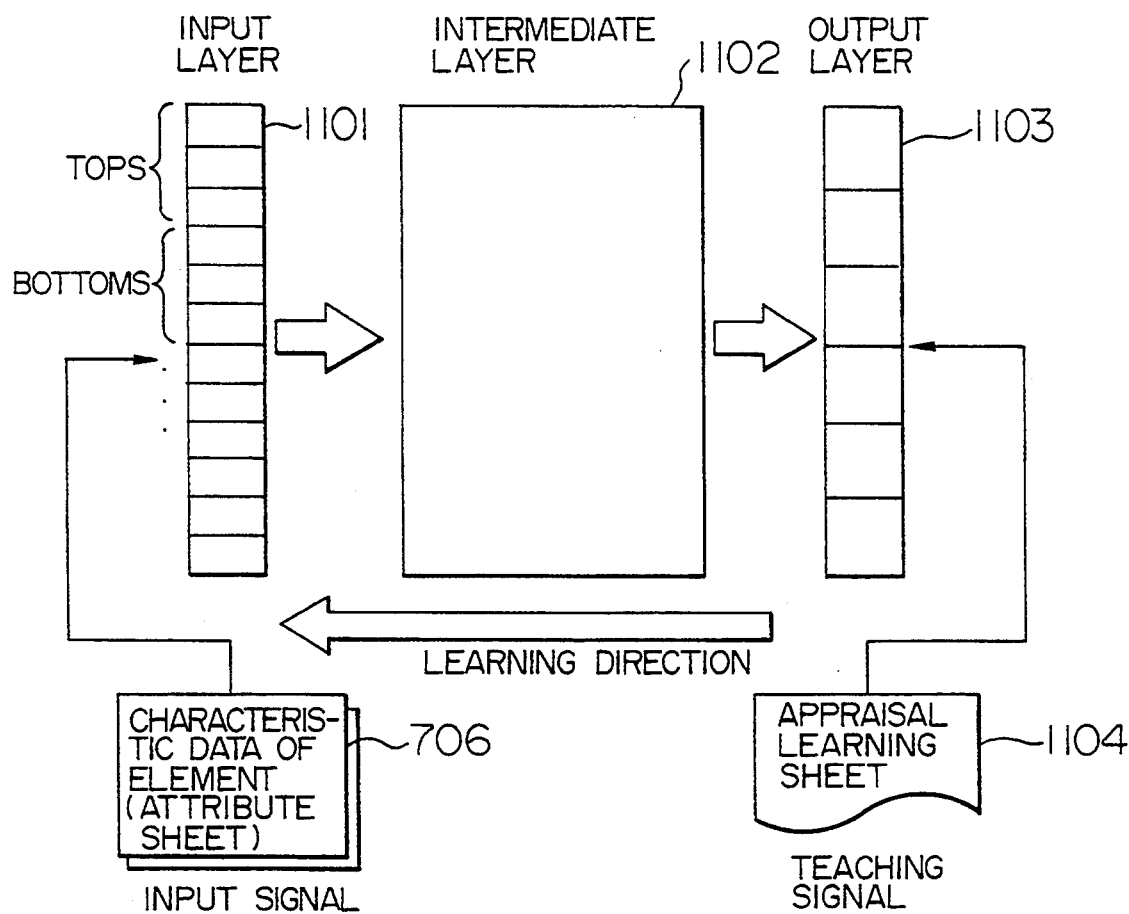
FIG. 11B is a table showing an example of a learning sheet used in the neural network of FIG. 11A.
Figure 13:
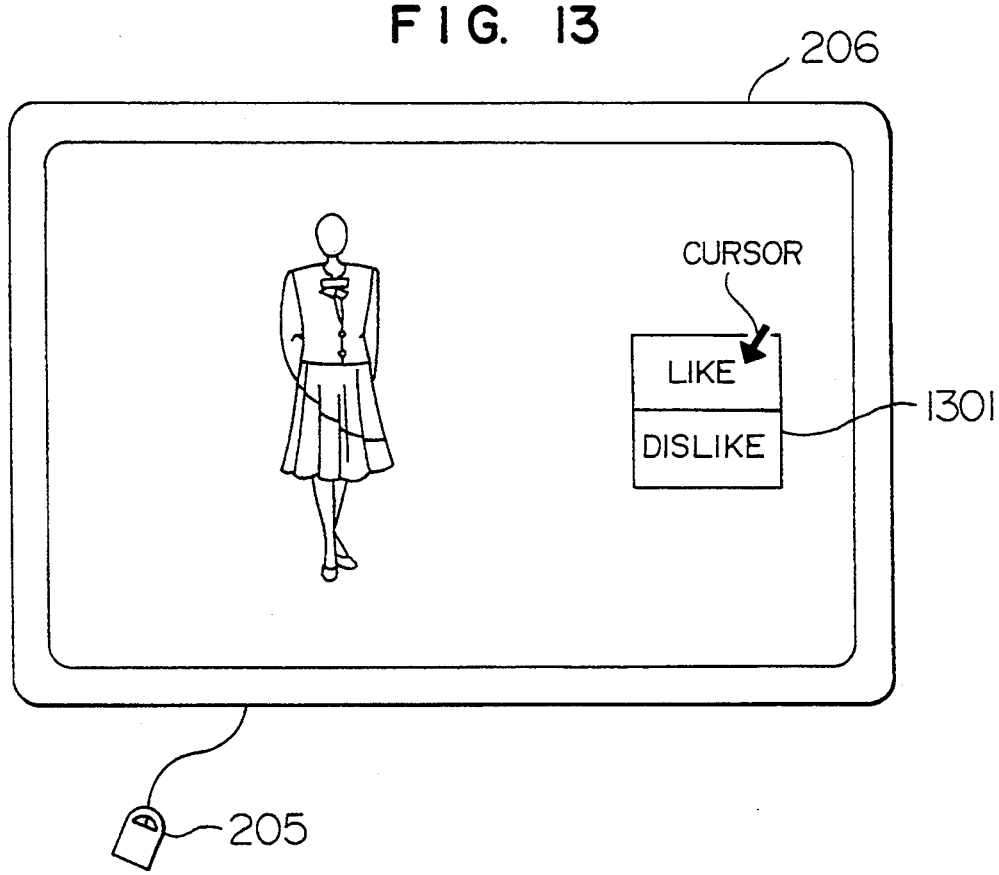
FIG. 13 is a diagram used for explaining a method of appraising a coordinate design image based on common kansei.
Figure 14:
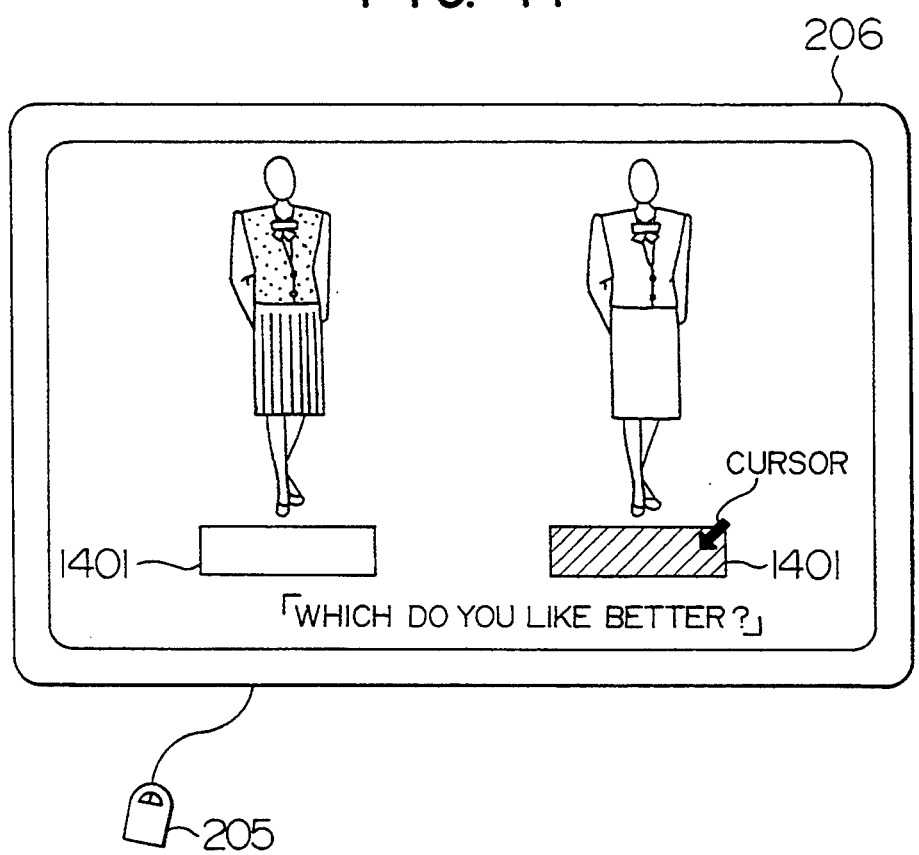
FIG. 14 is a diagram used for explaining a method of appraising a coordinate design image based on a plurality of specific kansei.

The aforementioned correspondence is learned, for example, by a multi-layer type neural network (an input layer: 1101, an intermediate (hidden) layer: 1102, an output layer: 1103) in the unit 104. As an example of a learning method, a back propagation method is employed which is widely known in general. Input signals to the network are the tops and bottoms, i.e., elements of the design image and combined patterns of characteristic data of the elements (those shown on the attribute sheet 706), while an output signal (also referred to as a teaching signal) is an appraisal learning sheet 1104 (FIG. 11B) indicating a column of scores for respective sets of paired adjectives. This appraisal learning sheet 1104 indicates scores for sets of paired adjectives, for example, "intellectual—not intellectual", "elegant—not elegant", and so on, which correspond to common kansei of the class I, for each common kansei. The neural network which has learned the above correspondence is then supplied with as many combinations as possible of elements of the design image including unknown combinations to simulate scores for respective sets of paired adjectives.

From the results, combinations of elements of the design image presenting a score above a predetermined value (for example, 0.5) are extracted for each set of paired adjectives and arranged in the order of larger scores. To make searching easier, files respectively having each element designated as a key are created and stored in the magnetic disk unit 203. Hereinbelow, this group of files is generally called a kansei database 1201 (FIG. 12). FIG. 12 shows scores for a set of paired adjectives "pretty—not pretty" when a form of skirt and a color of skirt are combined in a file with "blouse" as a key item (whose characteristic data is neck, white, etc.).

Each step in FIG. 5 represents a processing of the accumulation system directed to ordinary and multiple users (appraisers). On the other hand, each step in FIG. 6 represents a processing of a use system directed only to a single user or users belonging to a particular group. This processing of the use system is started by inputting from the input device 205 an instruction to start the processing. <step 601> Comparison of user kansei with common kansei The unit 105 assumes an arbitrary common kansei and searches the kansei database 1201 to extract from the storage unit 203 the coordinates (a method of combining elements constituting a design image) which most intensively express an image of a typical set of paired adjectives related to the common kansei. Next, the unit 102, based on the extracted combination method, pastes image elements on a model image of a woman's figure to synthesize a design image of the coordinates and outputs the same to the graphic display 206. An appraisal to the output design image is inputted by appraisers, for example, in kansei of "like or dislike". For example, the appraiser picks an appropriate one of buttons 1301 on the screen with the mouse 205. Basically, a criterion forming the basis of a coordinates image to which "like" is selected is determined to be kansei of a particular user. The foregoing processings are repeated for all common kansei.

<step 602> Comparison of user kansei with specific kansei

At this step, user kansei is more precisely analyzed by the unit 105. For each of specific kansei in the common kansei to which "like" has been selected at the previous step, design images are synthesized and the plurality of synthesized design images are simultaneously displayed on the graphic display 206. Then, answer to "which do you like better" with respect to the simultaneously displayed design images is inputted by picking one of buttons 1401 on the screen with the mouse 205. Thus, multiple specific kansei are rapidly narrowed down in accordance with a particular user's kansei and stored in the storage unit 203.

<step 603> Output of design image based on analyzed user's kansei

The unit 106 finds the user kansei analyzed at step 602 in the kansei database 1201. In accordance with a designated combination (initially a default value) of elements (for example, a blouse is designated for the tops and a pair of pants for the bottoms), the coordinates having the largest score of the user kansei are extracted as desired coordinates. Then, image elements are pasted on the model image to create a design image which is outputted to the graphic display 206.

<step 604> Partial change of a design image

Figure 15A:
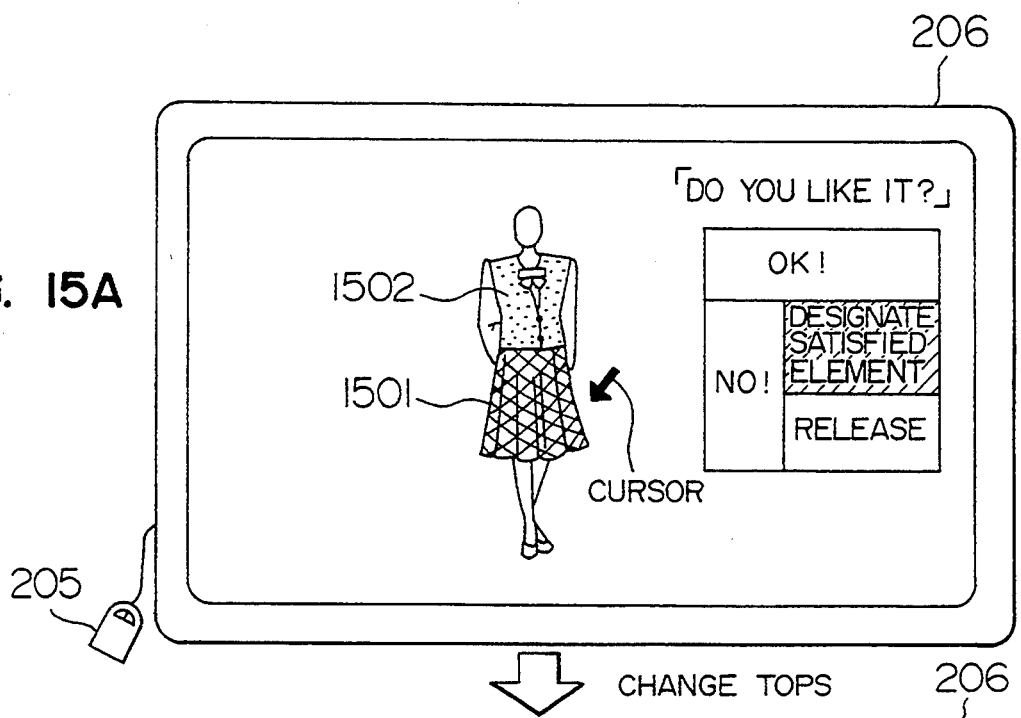
FIGS. 15A and 15B are diagrams illustrating an example of a partial change in a coordinate design image.
Figure 15B:
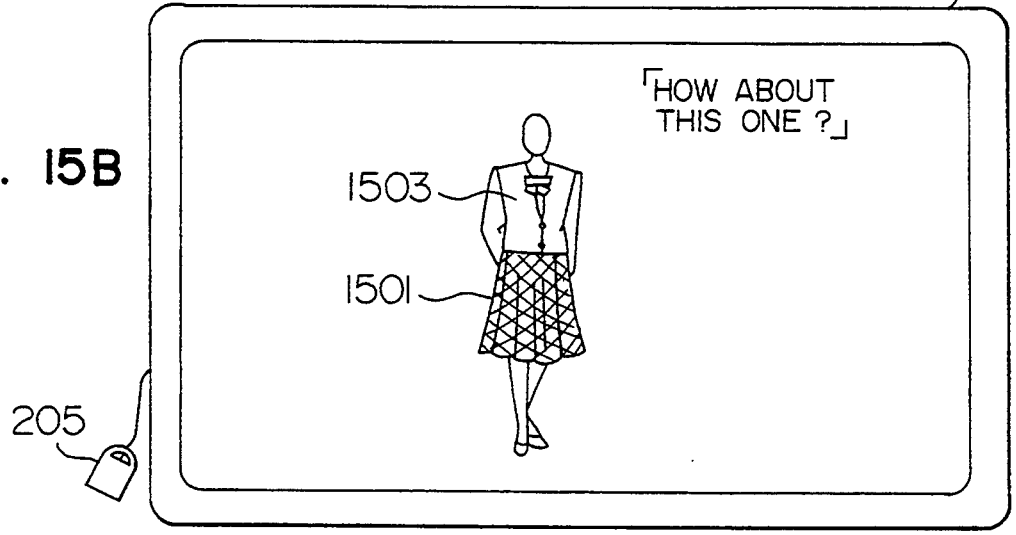

Basically, the above steps 602 and 603 can propose coordinates with which the user is satisfied. However, the user is not always satisfied with the thus proposed coordinates. FIG. 15A shows that the bottoms is a satisfactory element 1501 while the tops is not a satisfactory element 1502. In this case, information for designating the user satisfied element 1501 is inputted from the input device 205. The unit 106 then determines that the remaining element is the unsatisfactory element 1502. For this element 1502, the unit 106 displays a question "Do you like this?". The user, after designating a satisfactory element, inputs OK or NO to the input device 205. An element 1503 which includes the satisfactory element 1501 and can obtain a high score, if combined with the element 1501, by the analyzed user's kansei is extracted from the kansei database 1201 as a proposed substitute for the element 1502 for alternative coordinates, and a design image is synthesized and outputted to the graphic display 206 by the unit 102. At this time, the user answers a question "How about this one?".

Of course, a generally used natural language interface may be employed as the unit 106 for designating an element for changing a combination. In this case, a change of an element can be specifically designated as to "How do you want to change it?". If the user inputs a requirement of, for example, "I want to make the image reddish in general.", candidates which are most likely to satisfy the requirement, for example, crimson, orange and so on are proposed in this order for such a change.

Incidentally, if information is inputted to designate the unsatisfactory element 1502 to determine that the remaining element 1501 is satisfactory, similar functions to the foregoing can be performed. Further, new elements (e.g., a hat and so on) may be added to candidates of satisfactory elements.

In the foregoing embodiment, as described above, an example has been given where the present invention is realized as a system for proposing recommendation of coordinates for women's clothes, however, the present invention is not of course limited thereto. The data processing apparatus described in the embodiment is widely applicable to a combination of other kinds of merchandise which requires a high-level kansei for determination such as furniture and audio equipment. Further, by considering features of human's appearance (shape and color of face, hair style, mustached or not, figure, and so on), features of fixture for displaying goods (color, shape, size), and so on, the present invention can be further widely applicable to a more delicate coordinates information service suitable to each individual as well as to the determination of a method of displaying goods in fixture which has an important role for designing a layout in a store.

According to the present invention as described above in detail, since the system can precisely analyze taste in complicated, subtle and widely changeable fashion, even sales staff insensitive to kansei of a target customer, if using this system, is supported to uniformly and stably carry out businesses requiring extremely high-level kansei such as face-to-face sales, store layout design, merchandise planning, and so on.

We claim:

1. A data processing method for supporting analysis/judgement comprising the steps of:

inputting a plurality of objects to be appraised, the objects each including a plurality of structural elements, at least some of the structural elements being common to a plurality of objects;

dividing said inputted objects into the plurality of structural elements and storing said structural elements in a storage means;

inputting information indicative of an appraisal for each inputted object as a whole;

identifying at least one relationship between each structural element and said inputted appraisal information for the objects of which said each element is a part; and classifying said relationship and storing the classified relationship in said storage means.

2. A data processing method according to claim 1, wherein:

said object to be appraised is expressed in either image or speech form.

3. A data processing method according to claim 1, wherein:

said step for dividing includes the steps of:

previously storing structural models among elements related to said object to be appraised in said storage means; and dividing said object to be appraised into structural elements with reference to said models.

4. A data processing method according to claim 1, wherein:

said dividing step includes the step of dividing said object to be appraised into structural elements, in response to inputted information instructing a division, with reference to said instruction information.

5. A data processing method for supporting analysis/judgement comprising the steps of:

inputting an outfit to be appraised;

outputting said inputted outfit to an output means;

dividing said inputted outfit into clothing elements and storing said clothing elements in a storage means;

inputting information indicative of an appraisal of said outputted outfit as a whole; and for each of a plurality of criteria, obtaining a correspondence between the clothing elements of said outfit to be appraised and said inputted appraisal information for said outfit as a whole and storing the correspondence of the clothing elements and said inputted appraisal information of the outfits of which the clothing element is a part for each criterion in said storage means.

6. A data processing method for supporting analysis/judgement, comprising the steps of:

selecting a first criterion from among a plurality of criterions;

obtaining a first combination of structural elements on the basis of said selected first criterion;

inputting first appraisal information for said obtained combination of structural elements;

comparing said obtained combination of structural elements and said appraisal information with said selected first criterion to identify a second criterion;

creating a second combination of elements constituting an object to be appraised on the basis of said identified criterion;

inputting information for designating elements to be changed and elements not to be changed in said second combination; and creating a third combination of elements on the basis of said input designation information.

7. A data processing method for supporting analysis/judgement, comprising the steps of:

selecting a first criterion from among a plurality of criterions;

reading a first combination of structural elements on the basis of said selected first criterion from a storage means;

synthesizing an object to be appraised on the basis of said read first combination of elements and outputting the first combination of elements to an output means;

inputting appraisal information for said outputted object to be appraised;

determining a correspondence between the first combination of elements and said appraisal information; and comparing said correspondence with said selected first criterion to identify a second criterion.

8. A data processing method according to claim 7, further comprising the steps of:

creating a combination of structural elements on the basis of said identified second criterion;

synthesizing an object to be appraised on the basis of said created combination and outputting said synthesized object to be appraised to the output means;

inputting appraisal information for said outputted object to be appraised;

when said appraisal is low, inputting information for designating elements to be changed and elements not to be changed in said created combination; and creating a new combination on the basis of said designation information to synthesize and output a new object to be appraised.

9. A data processing method according to claim 8, further comprising the step of performing said step of identifying said criterion when an appraisal for said new combination is low.

10. A data processing method according to claim 7, wherein:

said appraisal for the object to be appraised is inputted as information for designating whether or not said object to be appraised is inputted.

11. A data processing method according to claim 7, wherein:

said object to be appraised is expressed in either image or speech form.

12. A data processing apparatus for supporting analysis/judgement comprising:

means for inputting an object to be appraised;

means for dividing said inputted object to be appraised into a combination of structural elements and storing said elements in storage means;

means for inputting information indicative of an appraisal for said inputted object to be appraised; and means for identifying relationships between the combination of elements constituting said object to be appraised and said inputted appraisal information, and classifying said relationships into criterions and storing the same in said storage means.

13. A data processing apparatus according to claim 12, wherein:

said object to be appraised is expressed in either image or speech form.

14. A data processing apparatus according to claim 12, wherein:

said means for dividing includes:

means for previously storing structural models among elements related to said object to be appraised in said storage means; and means for dividing said object to be appraised into structural elements with reference to said models.

15. A data processing apparatus according to claim 12, wherein:

said means for dividing includes means for dividing said object to be appraised into structural elements, in response to inputted information instructing a division, with reference to said instruction information.

16. A data processing apparatus for supporting analysis/judgement comprising:

means for inputting an object to be appraised;

means for outputting said inputted object to be appraised to an output means;

means for dividing said inputted object to be appraised into elements and storing the elements in a storage means;

means for inputting information indicative of an appraisal for at least one criterion for said outputted object as a whole; and means for determining for each of a plurality of criteria a correspondence between said elements and said inputted appraisal information for the object as a whole, and storing the same in said storage means.

17. A data processing apparatus for supporting analysis/judgement, comprising:

means for arbitrarily selecting a first criterion from a plurality of criterions;

means for obtaining a first combination of structural elements on the basis of said selected first criterion;

means for inputting an appraisal information for said obtained first combination of elements;

means for comparing said obtained first combination of elements and said appraisal information with said selected first criterion to identify a second criterion;

means for creating a second combination of elements constituting an object to be appraised on the basis of said identified second criterion;

means for inputting information for designating elements of said second combination to be changed; and means for creating a third combination of elements on the basis of said designation information.

18. A data processing apparatus for supporting analysis/judgement, comprising:

means for arbitrarily selecting a first criterion from a plurality of criterions;

means for reading a first combination of structural elements on the basis of said selected first criterion from a storage means;

means for synthesizing an object to be appraised on the basis of said read first combination of elements and outputting the synthesized object to an output means;

means for inputting appraisal information for said outputted object to be appraised;

means for determining a correspondence between the first combination of elements and said appraisal information; and means for comparing said correspondence with said selected first criterion to identify a second criterion.

19. A data processing apparatus according to claim 18, further comprising:

means for creating a combination of structural elements on the basis of said identified second criterion;

means for synthesizing an object to be appraised on the basis of said created combination and outputting the same to the output means;

means for inputting appraisal information for said outputted object to be appraised;

means for, when said appraisal is low, inputting information for designating elements to be changed and elements not to be changed in said created combination; and means for creating a new combination on the basis of said designation information to synthesize and output an object to be appraised.

20. A data processing apparatus according to claim 18, wherein:

said appraisal for the object to be appraised is inputted as information for designating whether or not said object to be appraised is selected.

21. A data processing apparatus according to claim 18, wherein:

said object to be appraised is expressed in either image or speech form.

22. A data processing apparatus for supporting analysis/judgement, comprising:

means for inputting objects to be appraised;

means for outputting each object to be appraised to a human readable output means;

means for dividing each of said inputted objects to be appraised into at least one element and storing said elements in a storage means;

means for inputting information indicative of an appraisal of each outputted object to be appraised;

means for determining a correspondence between each object to be appraised and said inputted appraisal information;

means for classifying said correspondence into a plurality of criterions and storing the plurality of criterions in said storage means;

means for arbitrarily selecting an arbitrary first criterion from among said plurality of stored criterions stored in the storage means;

means for reading a first combination of elements on the basis of said selected first criterion from the storage means;

a means for synthesizing a synthesized object to be appraised from said read first combination of elements add outputting the synthesized object to the output means;

means for inputting appraisal information for said synthesized object;

means for estimating a second criterion based on said appraisal information and said first criterion.

23. A data processing method for supporting analysis/judgement comprising the steps of:

inputting a plurality of objects to be appraised, each object having a plurality of structural elements, and some of the objects having some common structural elements with other objects;

outputting each said inputted object to be appraised to an output means;

dividing said inputted objects to be appraised into the plurality of structural elements and storing said elements in a storage means;

inputting information indicative of an appraisal for each of a plurality of criteria of each said outputted object as a whole; and obtaining for each criterion, the elements of said object to be appraised and said inputted appraisal information and storing the elements individually with said inputted appraisal information of the objects as a whole of which each element is a component in said storage means.

24. A data processing method for supporting analysis/judgement by using a storage means for storing combinations of structural elements each constituting an object to be appraised and a plurality of criterions as to said combinations, said method comprising the steps of:

selecting an arbitrary first criterion from among said plurality of criterions stored in said storage means;

reading a first combination of structural elements on the basis of said selected first criterion from said storage means and outputting said first combination of structural elements to an output means;

inputting first appraisal information for said outputted first combination of structural elements; and estimating a second criterion on the basis of said first criterion and said first appraisal information.

25. A data processing method according to claim 24 further comprising a step of:

creating a second combination of structural elements constituting an object to be appraised on the basis of said estimated second criterion and outputting said second combination of structural elements to said output means.

26. A data processing method according to claim 25 further comprising steps of:

inputting information for designating an element to be changed or an element not to be changed of said outputted second combination of structural elements; and creating a third combination of structural elements on the basis of said inputted designation information and outputting said third combination of structural elements to said output means.

27. A data processing method according to claim 24 further comprising a step of:

obtaining a second combination of structural elements constituting an object to be appraised from said storage means on the basis of said estimated second criterion and outputting said second combination of structural elements to said output means.

28. A data processing method for supporting analysis/judgement by using a storage means for storing combinations of structural elements each constituting an object to be appraised and a plurality of criterions as to said combinations, said method comprising the steps of:

selecting an arbitrary first criterion from among said plurality of criterions stored in said storage means;

reading a first combination of structural elements on the basis of said selected first criterion from said storage means;

synthesizing an object to be appraised on the basis of said read first combination of structural elements and outputting the object to an output means;

inputting first appraisal information from a user for said outputted object to be appraised and estimating a second criterion on the basis of said first criterions and said first appraisal information.

29. A data processing method according to claim 28, further comprising steps of:

inputting a structural element to be added; and synthesizing a new object to be appraised on the basis of said second combination of structural elements and said inputted structural element and outputting said object to said output means.

30. A data processing method according to claim 28 further comprising steps of:

creating a second combination of structural elements constituting an object to be appraised on the basis of said estimated second criterion; and synthesizing an object to be appraised on the basis of said second combination of structural elements and outputting the object to said output means.

31. A data processing method according to claim 30 further comprising steps of:

inputting information for designating an element to be changed or an element not to be changed of said outputted second combination of structural elements;

creating a third combination of structural elements on the basis of said inputted designation information; and synthesizing an object to be appraised on the basis of said third combination of structural elements and outputting to said output means.

32. A data processing method according to claim 30 further comprising steps of:

inputting second appraisal information of said user for said outputted object to be appraised based on said second combination of structural elements;

inputting information for designating an element to be changed or an element not to be changed of said outputted second combination of structural elements when an appraisal of said second appraisal information is lower than a predetermined appraisal;

creating a third combination of structural elements on the basis of said inputted designation information; and synthesizing an object to be appraised on the basis of said third combination of structural elements and outputting to said output means.

33. A data processing method according to claim 32, where in said step of inputting said designating information includes a step of inputting said designating information using natural language information.

34. A data processing method for supporting analysis/judgement by using a storage means storing combinations of structural elements each constituting an object to be appraised and a plurality of criterions as to said combinations, said method comprising:

a first step of selecting an arbitrary first criterion from among said plurality of criterions stored in said storage means;

a second step of reading a first combination of structural elements on the basis of said selected first criterion from said storage means;

a third step of synthesizing an object to be appraised on the basis of said read first combination of structural elements and outputting the object to be appraised to an output means;

a fourth step of inputting first appraisal information of a user for said outputted object to be appraised;

a fifth step of estimating a second criterion on the basis of said first criterion and said first appraisal information;

a sixth step of creating a combination of structural elements on the basis of a latest estimated criterion;

a seventh step of synthesizing an object to be appraised on the basis of said combination of structural elements created in said sixth step and outputting to said output means;

an eighth step of inputting appraisal information of said user for said outputted object to be appraised synthesized in said seventh step;

a ninth step of estimating a new criterion on the basis of said appraisal information inputted at said eighth step and at least one of appraisal information having been inputted; and a tenth step of estimating a final criterion of said user by repeating said sixth to ninth steps at least one time.

35. A data processing method according to claim 34, wherein said tenth step includes:

a step of determining said new criterion estimated at said ninth step as a final criterion of said user when an appraisal of said appraisal information inputted at said eighth step is not lower than a predetermined appraisal, and a step of repeating said sixth to ninth steps when said appraisal of said appraisal information inputted at said eighth step is lower than said predetermined appraisal.

36. A data processing method according to claim 34 further comprising steps of:

creating a second combination of structural elements constituting an object to be appraised on the basis of said determined final criterion; and synthesizing an object to be appraised on the basis of said second combination of structural elements and outputting to said output means.

37. A data processing method according to claim 36 further comprising steps of:

inputting information for designating an element to be changed or an element not to be changed of said outputted second combination of structural elements;

creating a third combination of structural elements on the basis of said inputted designation information; and synthesizing an object to be appraised on the basis of said third combination of structural elements and outputting to said output means.

38. A data processing method according to claim 34 wherein said fifth step includes:

a step of determining said second criterion estimated at said fifth step as a final criterion of said user when an appraisal of said appraisal information inputted at said fourth step is not lower than a predetermined appraisal, and a step of proceeding to said sixth step when said appraisal of said appraisal information inputted at said fourth step is lower than said predetermined appraisal.

39. A data processing method for supporting analysis/judgement comprising the steps of:

a) inputting at least a first object to be appraised;

b) outputting said inputted object to be appraised to an output means;

c) dividing said inputted object to be appraised into at least one structural element and storing said elements in a storage means;

d) inputting information indicative of an appraisal of said outputted object;

e) determining a correspondence between the elements of said object to be appraised and said inputted appraisal information;

f) classifying said correspondence into at least one criterion and storing the classified criterion in said storage means;

g) repeating steps (a)-(f) for a plurality of appraisals such that a plurality of criterions are stored in the storage means;

h) selecting an arbitrary first criterion from among said plurality of criterions stored in said storage means;

i) reading a first combination of structural elements on the basis of said selected first criterion from said storage means;

j) synthesizing said read first combination of structural elements into a synthesized object to be appraised and outputting the synthesized object to an output means;

k) inputting first appraisal information of a user for said outputted synthesized object to be appraised and estimating a second criterion on the basis of said first criterion and said first appraisal information.

40. A data processing method according to claim 39 further comprising steps of:

creating a second combination of structural elements constituting an object to be appraised on the basis of said estimated second criterion; and synthesizing an object to be appraised on the basis of said second combination of structural elements and outputting the object to said output means.

41. A data processing method according to claim 40 further comprising steps of:

inputting information for designating an element to be changed or an element not to be changed of said outputted second combination of structural elements;

creating a third combination of structural elements on the basis of said inputted designation information; and synthesizing an object to be appraised on the basis of said third combination of structural elements and outputting to said output means.

42. A data processing method according to claim 40 further comprising steps of:

inputting second appraisal information of said user for said outputted object to be appraised based on said second combination of structural elements;

inputting information for designating an element to be changed or an element not to be changed of said outputted second combination of structural elements when an appraisal of said second appraisal information is lower than a predetermined appraisal;

creating a third combination of structural elements on the basis of said inputted designation information; and synthesizing an object to be appraised on the basis of said third combination of structural elements and outputting to said output means.

43. A data processing apparatus for supporting analysis/judgement comprising:

means for inputting objects to be appraised;

means for outputting each inputted object to be appraised to an output means;

means for dividing said inputted objects to be appraised into a plurality of structural elements and storing said elements in a storage means, at least some of the structural elements being common to more than one of the objects;

means for inputting information indicative of an appraisal for at least one criterion of said outputted object to be appraised as a whole; and means for obtaining, for each criterion, the elements of said objects to be appraised and said inputted appraisal information of the object as a whole and storing each element and said inputted appraisal information, for each of the objects to which the element is common for each criterion, in said storage means.

44. A data processing apparatus for supporting analysis/judgement, said apparatus comprising:

a storage means for storing (i) combinations of structural elements which each constitute an object to be appraised and (ii) a plurality of criterions for said combinations;

means for selecting an arbitrary first criterion from among said plurality of criterions stored in said storage means;

means for reading a first combination of structural elements on the basis of said selected first criterion from said storage means and outputting said first combination of structural elements to an output means;

means for inputting first appraisal information for said outputted first combination of structural elements; and means for estimating a second criterion on the basis of said first criterion and said first appraisal information.

45. A data processing apparatus according to claim 44 further comprising:

means for creating a second combination of structural elements constituting an object to be appraised on the basis of said estimated second criterion and outputting said second combination of structural elements to said output means.

46. A data processing apparatus according to claim 45 further comprising:

means for inputting information for designating an element to be changed or an element not to be changed of said outputted second combination of structural elements; and means for creating a third combination of structural elements on the basis of said inputted designation information and outputting said third combination of structural elements to said output means.

47. A data processing apparatus according to claim 44 further comprising:

means for obtaining a second combination of structural elements constituting an object to be appraised from said storage means on the basis of said estimated second criterion and outputting said second combination of structural elements to said output means.

48. A data processing apparatus for supporting analysis/judgement, said apparatus comprising:

a storage means for storing combinations of structural elements each constituting an object to be appraised and a plurality of criterions as to said combinations;

means for selecting an arbitrary first criterion from among said plurality of criterions stored in said storage means;

means for reading a first combination of structural elements on the basis of said selected first criterion from said storage means;

means for synthesizing an object to be appraised on the basis of said read first combination of structural elements and outputting the object to an output means;

means for inputting first appraisal information of a user for said outputted object to be appraised and estimating a second criterion on the basis of said first criterion and said first appraisal information.

49. A data processing apparatus according to claim 48, further comprising:

means for inputting a structural element to be added; and means for synthesizing a new object to be appraised on the basis of said second combination of structural elements and said inputted structural element and outputting said object to said output means.

50. A data processing apparatus according to claim 48 further comprising:

means for creating a second combination of structural elements constituting an object to be appraised on the basis of said estimated second criterion; and means for synthesizing an object to be appraised on the basis of said second combination of structural elements and outputting the object to said output means.

51. A data processing apparatus according to claim 50 further comprising:

means for inputting information for designating an element to be changed or an element not to be changed of said outputted second combination of structural elements;

means for creating a third combination of structural elements on the basis of said inputted designation information; and means for synthesizing an object to be appraised on the basis of said third combination of structural elements and outputting to said output means.

52. A data processing apparatus according to claim 50 further comprising steps of:

means for inputting second appraisal information of said user for said outputted object to be appraised based on said second combination of structural elements;

means for inputting information for designating an element to be changed or an element not to be changed of said outputted second combination of structural elements when an appraisal of said second appraisal information is lower than a predetermined appraisal;

means for creating a third combination of structural elements on the basis of said inputted designation information; and means for synthesizing an object to be appraised on the basis of said third combination of structural elements and outputting to said output means.

53. A data processing apparatus according to claim 52, wherein said means for inputting said designating information includes a means for inputting said designating information using natural language information.

54. A data processing apparatus for supporting analysis/judgement, said apparatus comprising:

a storage means for storing combinations of structural elements which combinations each constitute an object to be appraised and a plurality of criterions as to said combinations;

means for selecting an arbitrary first criterion from among said plurality of criterions stored in said storage means;

means for reading a first combination of structural elements on the basis of said selected first criterion from said storage means;

means for synthesizing an object to be appraised on the basis of said read first combination of structural elements and outputting the object to be appraised to an output means;

means for inputting first appraisal information of a user for said outputted object to be appraised;

means for estimating a second criterion on the basis of said first criterion and said first appraisal information;

means for creating a second combination of structural elements on the basis of a latest estimated criterion;

means for synthesizing a second object to be appraised on the basis of said second combination of structural elements and outputting the second object to said output means;

means for inputting second appraisal information of said user for said outputted second object to be appraised;

means for estimating a new criterion on the basis of said second appraisal information and at least one of appraisal information having been inputted; and means for estimating a final criterion of said user.

55. A data processing apparatus according to claim 54, wherein said means for estimating a final criterion includes:

means for determining said new criterion as a final criterion of said user when an appraisal of said second appraisal information is not lower than a predetermined appraisal, and means for re-estimating a new criterion when said appraisal of said second appraisal information is lower than said predetermined appraisal.

56. A data processing apparatus according to claim 54 further comprising:

means for creating a third combination of structural elements constituting an object to be appraised on the basis of said determined final criterion; and synthesizing a third object to be appraised on the basis of said second combination of structural elements and outputting the third object to said output means.

57. A data processing apparatus according to claim 56 further comprising:

means for inputting information for designating an element to be changed or an element not to be changed of said outputted third combination of structural elements;

means for creating a fourth combination of structural elements on the basis of said inputted designation information; and means for synthesizing a fourth object to be appraised on the basis of said fourth combination of structural elements and outputting the fourth object to said output means.

58. A data processing apparatus according to claim 54 wherein said means for estimating a second criterion includes:

means for determining said second criterion as a final criterion of said user when an appraisal of said first appraisal information is not lower than a predetermined appraisal, and a means for judging whether said second appraisal information is lower than said predetermined appraisal.

* * * * *